United States Patent
Zhu et al.

(10) Patent No.: US 10,114,644 B2
(45) Date of Patent: Oct. 30, 2018

(54) ZERO-OVERHEAD LOOP IN AN EMBEDDED DIGITAL SIGNAL PROCESSOR

(71) Applicant: STMicroelectronics (Beijing) R&D Co. Ltd, Beijing (CN)

(72) Inventors: PengFei Zhu, Beijing (CN); Xiao Kang Jiao, Beijing (CN)

(73) Assignee: STMICROELECTRONICS (BEIJING) R&D CO. LTD, Beijing (CN)

( * ) Notice: Subject to any disclaimer, the term of this patent is extended or adjusted under 35 U.S.C. 154(b) by 273 days.

(21) Appl. No.: 15/220,338

(22) Filed: Jul. 26, 2016

(65) Prior Publication Data
US 2017/0344375 A1 Nov. 30, 2017

(30) Foreign Application Priority Data
May 30, 2016 (CN) .......................... 2016 1 0371861

(51) Int. Cl.
*G06F 9/30* (2018.01)
*G06F 9/38* (2018.01)
*G06F 9/32* (2018.01)

(52) U.S. Cl.
CPC ...... *G06F 9/30065* (2013.01); *G06F 9/30058* (2013.01); *G06F 9/325* (2013.01); *G06F 9/3822* (2013.01)

(58) Field of Classification Search
CPC ............. G06F 9/30065; G06F 9/30145; G06F 9/3818; G06F 9/382; G06F 9/3822
See application file for complete search history.

(56) References Cited

U.S. PATENT DOCUMENTS

| | | | | |
|---|---|---|---|---|
| 5,951,675 A | * | 9/1999 | Narayan | G06F 9/30149 712/215 |
| 7,159,103 B2 | * | 1/2007 | Ahmad | G06F 9/325 712/239 |
| 9,798,542 B2 | * | 10/2017 | Kurd | G06F 9/30145 |

* cited by examiner

*Primary Examiner* — Benjamin P Geib
(74) *Attorney, Agent, or Firm* — Seed IP Law Group LLP

(57) ABSTRACT

A decoding logic method is arranged to execute a zero-overhead loop in an embedded digital signal processor (DSP). In the method, instruction data is fetched from a memory, and a plurality of instruction tokens, which are derived from the instruction data, are stored in a token buffer. A first portion of one or more instruction tokens from the token buffer are passed to a first decode module, which may be an instruction decode module, and a second portion of the one or more instruction tokens from the token buffer are passed to a second decode module, which may be a loop decode module. The second decode module detects a special loop instruction token, and based on the detection of the special loop instruction token, a loop counter is conditionally tested. Using the first decode module, at least one instruction token of an iterative algorithm is assembled into a single instruction, which is executable in a single execution cycle. Based on the conditional test of the loop counter, the first decode module further assembles a loop branch instruction of the iterative algorithm into the single instruction executable in one execution cycle.

20 Claims, 2 Drawing Sheets

| opcode | counter | target or negative offset | one token counter_next space = counter_cur + 1
if counter_cur is non-zero, then
    jump-back to target (or PC-relative offset from current location)
else
    fall through to execute first instruction after the loop
end

FIG. 1

ZERO-OVERHEAD LOOP IN AN EMBEDDED DIGITAL SIGNAL PROCESSOR

BACKGROUND

Technical Field

The present disclosure generally relates to embedded digital signal processors (DSPs). More particularly, but not exclusively, the present disclosure relates to a zero-overhead loop in an embedded DSP.

Description of the Related Art

Traditional embedded digital signal processors (DSPs) are widely used in industrial applications, consumer applications, and many other applications. Traditional embedded DSPs focus on accelerating special digital algorithms in support of broader applications. For example, a traditional mobile cellular phone may include an applications processor to control a user interface, user application programs, storage and delivery of multimedia, and the like. In these cases, the traditional mobile cellular phone will also include an embedded DSP for mobile radio processing, image processing, and other algorithm-heavy functions. More specifically, the embedded DSP is used to implement fast Fourier transforms (FFTs), finite impulse response (FIR) filters, convolution oil and coding and decoding, and more. One common feature of many digital signal algorithms is the repeated execution of a small number of specific instructions hundreds, thousands, or even millions of times to arrive at a single result.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The problem of inefficient kernel loops caused by overhead of control instructions to decrement a counter, test the counter, and jump back to the beginning of the loop is solved with an embedded DSP having decode logic that combines a new looping instruction and a normal instruction and executes both together as a single instruction.

In a processor, such as a digital signal processing (DSP) processor, a new loop instruction has a special format, and new decoding logic detects the new loop instruction. When the new loop instruction is detected and executed, the loop condition and a conditional jump-back are concurrently carried out. The new loop instruction cooperates with previously known, normal instructions to reduce execution cycle overhead in certain kernel looping functions.

The zero-overhead loop architecture in the present disclosure includes a special structure of instruction encoding and a method to detect when a next following instruction is a particular part of a zero-overhead loop. If the zero-overhead loop instruction is not detected, then the new decoding logic will execute single instructions, one-by-one, as in a traditional processor. Alternatively, if the zero-overhead loop instruction is detected, then the new decoding logic will combine and execute two instructions together: the compare instruction and the jump instruction. In this way, a kernel loop executed in an embedded DSP is accelerated.

A decoding logic module arranged to execute a zero-overhead loop may be summarized as including: a fetch logic module; a token buffer coupled to the fetch logic module and arranged to store instruction tokens passed from the fetch logic module; a first decode module; a second decode module; a first multiplexer coupled between the token buffer and the first decode module and arranged to pass instruction tokens from the token buffer to the first decode module; a second multiplexer coupled between the token buffer and the second decode module and arranged to pass instruction tokens from the token buffer to the second decode module; and a loop control module arranged to test a loop counter and further arranged to update the loop counter in cooperation with the second decode module detecting a special loop instruction token, wherein the first decode module is arranged to assemble at least one instruction token of an iterative algorithm into a single instruction executable in a single execution cycle, and based on the loop control module test of the loop counter, the first decode module further arranged to assemble a loop branch instruction of the iterative algorithm into the single instruction executable in the single execution cycle.

The iterative algorithm may be executed in a kernel mode of an embedded digital signal processor. The loop control module arranged to test of the loop counter may include the loop control module arranged to compare the loop counter to zero, and wherein the loop control module arranged to further update the loop counter may include the loop control module arranged to decrement the loop counter.

A decoding logic module according may further include a token pointer arranged to direct the passage of instruction tokens through the first multiplexer to the first decode module, the token pointer further arranged to direct passage of the special loop instruction token through the first multiplexer to the first decode module based on the loop control module test of the loop counter.

The single execution cycle may be performed in a single clock cycle. The decoding logic module may be arranged in an embedded digital signal processor. The first decode module may be arranged to select which instruction tokens are passed from the token buffer to the second decode module through the second multiplexer.

A decoding logic method to execute a zero-overhead loop may be summarized as including: fetching instruction data from a memory; storing a plurality of instruction tokens in a token buffer, the plurality of instruction tokens derived from the instruction data; passing at least a first portion of one or more instruction tokens from the token buffer to a first decode module, the first decode module being an instruction decode module; passing at least a second portion of one or more instruction tokens from the token buffer to a second decode module, the second decode module being a loop decode module; detecting, with the second decode module, a special loop instruction token; based on the detection of the special loop instruction token, conditionally testing a loop counter; assembling, with the first decode module, at least one instruction token of an iterative algorithm into a single instruction executable in a single execution cycle; and based on the conditional test of the loop counter, further assembling, with the first decode module, a loop branch instruction of the iterative algorithm into the single instruction executable in one execution cycle.

The special loop instruction may be arranged for performance in the iterative algorithm just after a last instruction of the iterative algorithm.

A decoding logic method may further include updating the loop counter in association with conditionally testing the loop counter.

Updating the loop counter may include decrementing the loop counter.

A decoding logic method may further include unconditionally updating the loop counter each time a special loop instruction token is detected.

Conditionally testing the loop counter may include comparing the loop counter to zero. The iterative algorithm may be associated with a fast Fourier transform (FFT) algorithm or a finite impulse response (FIR) filter algorithm.

A decoding logic method may further include executing the single instruction during a next single execution cycle.

An integrated circuit may be summarized as including: a decoding logic module arranged to execute a zero-overhead loop, the decoding logic including: a fetch logic module to receive instruction data from a memory; a token buffer arranged to store a plurality of instruction tokens retrieved from the instruction data; a first decode logic module to assemble one or more tokens into a single instruction, the single instruction executable in a single execution cycle; a second decode logic module to identify a special loop instruction token; a first multiplexer to copy at least some of the one or more tokens from the token buffer to the first decode logic module; a second multiplexer to copy a prospective special loop instruction token to the second decode module, wherein upon detection of the special loop instruction token, a loop control module is arranged to test and modify a loop counter, and wherein upon detection of the loop counter crossing a threshold, the first decode logic module to assemble a loop branch instruction into the single instruction.

The integrated circuit may be arranged as an embedded digital signal processor (DSP).

An integrated circuit may further include an execution unit to execute the single instruction in one execution cycle, the single instruction arranged to carry out at least two operations, a first one of the at least two operations being a last operation of an iterative loop, and a second one of the at least two operations being a jump operation of the iterative loop.

The first decode logic may be arranged to assemble the one or more tokens into the single instruction concurrent with a time that the loop control module is arranged to test and modify the loop counter. The threshold may be zero.

This Brief Summary has been provided to introduce certain concepts in a simplified form that are further described in detail below in the Detailed Description. Except where otherwise expressly stated, the summary is not intended to identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 1 is a representation of a special zero-overhead loop instruction structure and corresponding operations.

DETAILED DESCRIPTION

Figure 2:
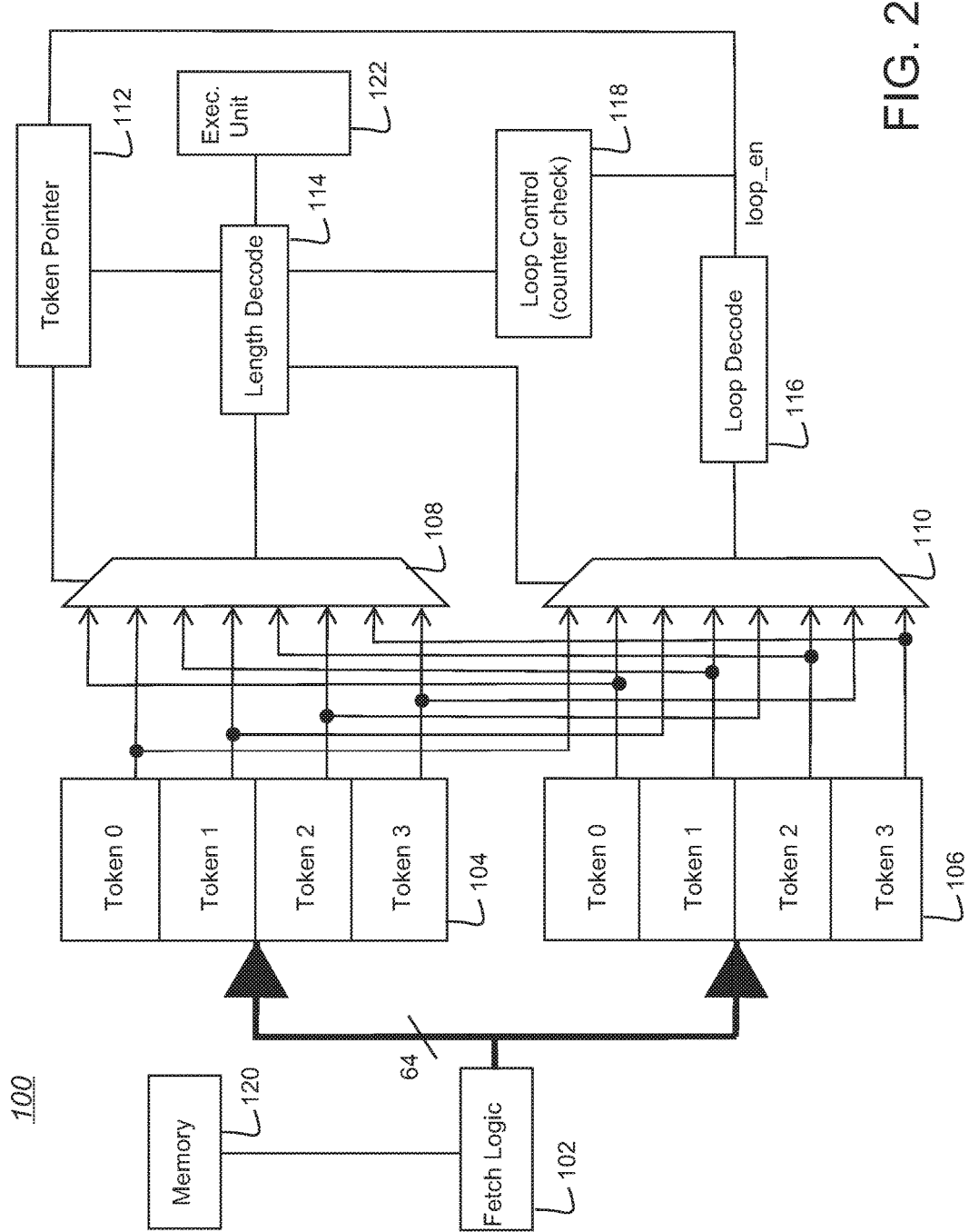
FIG. 2 is a block diagram showing a decode logic embodiment to selectively decode a special loop instruction with a normal instruction.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

The present inventors have recognized a shortcoming in traditional embedded digital signal processing (DSP) devices. Traditional embedded DSP devices implement algorithms such as fast Fourier transforms (FFTs) and finite impulse response (FIR) filters that process a stream of input data and generate a stream of output data. These algorithms execute certain essential instructions within a kernel loop tens, hundreds, thousands, or even millions of times, and the present inventors have recognized certain inefficiencies in how loops are implemented in traditional DSPs.

Table 1 illustrates assembler pseudo code of a kernel loop for a traditional DSP algorithm.

TABLE 1

Common code sequence to execute kernel loop

SET LOOP_COUNTER TO STARTING NUMBER OF LOOPS;
LOOP BEGIN:
    OPERATION INSTRUCTION 1;
    OPERATION INSTRUCTION 2;
    OPERATION INSTRUCTION 3;
    OPERATION INSTRUCTION 4;
    DECREASE LOOP_COUNTER;
    IF LOOP_COUNTER > 0, JUMP BACK LOOP_BEGIN;

The pseudo-code in Table 1 may be produced by a compiler tool from a higher level software programming language written by a software developer. When the instruction sequence is executed by a processor having a single-issue/decode structure, the total number of execution cycles consumed by the instruction sequence is calculated as the number of times through the loop multiplied by the number of instructions within the loop. Nevertheless, it is only the instructions within the loop that are desired; the instructions that are executed to implement the looping function (i.e., decreasing the counter and jumping back to the beginning of the loop) are overhead.

The instruction sequence of Table 1 has six instructions: four operative instructions, an instruction to update the loop counter, and a test/jump instruction to continue or exit the loop sequence. Considering the six instructions in the sequence, only four of the instructions are essential to the algorithm. Two of the six instructions are carried out as overhead to implement the looping function. In this example, 33% of the execution cycle time is expended simply to implement the looping function. The proportion of execution cycles dedicated to overhead versus the execution cycles dedicated to the algorithm negatively impacts the performance of an embedded DSP.

Another common operation programmed by many software developers and carried out in many embedded DSPs is a copy/move operation that transfers a block of data from one memory location to a different memory location. One such example of this operation is the MEMCPY function implemented in many standard C program libraries. When copying data, the essential instructions within a kernel loop are: LOAD and STORE. In this case, where a looping function includes only two operation instructions and two overhead instructions (i.e., decrease the counter and jump back to the beginning of the loop), the overhead represents 50% of the execution cycles, which means half of the processor throughput when executing the algorithm is expended to perform processor control instructions.

Known DSP techniques and architectures have heretofore been unable to resolve or improve the inefficiency of kernel looping functions, which are caused by control instruction overhead within a loop. Traditional embedded DSPs commonly use branch instructions to control the flow of instruction execution. Two mandatory operations are performed in order to determine whether or not a loop is finished. First, the counter is modified, and second, the counter is tested to determine whether or not the loop should be reentered or exited. Since both operations are necessary in these types of loops, traditional embedded DSPs have not been able to reduce overhead cycles expended to perform the looping control instruction.

In some micro-architecture processor designs, multiple instructions are issued in one cycle. Processors that implement this micro-architecture design are called multi-issue processors. These multi-issue processors are different from the embedded DSPs described herein, because these multi-issue processors duplicate a substantial portion of their logic in a processor pipeline. For example, in at least some multi-issue processors, certain decode logic, certain operand dependency checking logic, and certain register file read/write ports may all be duplicated. With particular respect to decoding logic and register read/write ports, implementing these structures consumes a substantial portion of chip-area, and operating these structures consumes a substantial amount of energy. For this reason, multi-issue processors are very different from single-issue processors, and multi-issue processors are not suitable for low power, embedded DSP applications.

The embodiments set forth in the present disclosure discuss two particular features. First, a special new control loop instruction is executed with a single-issue embedded DSP. Second, the special new control loop instruction is decoded and executed concurrently with a normal instruction.

The special loop instruction merges two operations. More particularly a first operation to modify a loop counter is merged with a second operation to conditionally jump-back at the end of a kernel loop. In this way a single, new jump-back instruction is constructed having operations of both modifying a loop counter and judging the counter value.

In some cases, modifying the loop counter includes decrementing (i.e., decreasing by one) the loop counter, and in other cases, modifying the loop counter includes incrementing (i.e., increasing by one) the loop counter. In some embodiments, the direction of modification, either increasing or decreasing, may be set by a user. In addition, in some embodiments, the "step" amount, which is the amount by which a loop counter is modified, is not necessarily set to one. For example, in some cases, a user or some other process may set the step amount (i.e., the modification amount) to 2, 8, or any other number.

FIG. 1 is a representation of a special zero-overhead loop instruction structure and corresponding operations, which may be performed by decoding logic integrated in a single instruction issue embedded DSP. As illustrated in the figure, a special opcode is included in the first tokens of the instructions so that the decoder may determine whether or not the instruction is a special loop instruction. The jump-back operation may jump to a particular absolute target address or an address counting back from the current value in the program counter (i.e., a negative PC-relative offset). In some embedded DSPs, the format of the instruction will imply that the target address is a specifically stated address, and in other embedded DSPs, the target address will be a negative PC-offset. In still other embedded DSPs, the type of target address may be manually selectable, programmatically selectable, or selectable in some other way. As shown in FIG. 1, the implementation of the special loop function is compact, and short enough to simplify the decoding logic.

Table 2 shows a particular loop instruction example of particular assembly code instructions that implement a MEMCPY function.

TABLE 2

Zero-overhead code sequence to execute kernel loop

LOOP:
    LDW %R0, [%R1]+;
    STW [%R2]+, %R0;
    JNZS %R12, 0, LOOP;

In the assembly code example of Table 2, the following paragraphs are provided to explain the use of instructions, registers, and labels.

"R0" is a general-purpose register used as a temporary register used to move a word-sized value from one buffer to another buffer.

"R1" is a general-purpose register used as an address pointer to a source buffer where the data to be moved is initially stored. The nomenclature used with R1, including the brackets and the summation sign (i.e., "+"), indicate a self-increasing/decreasing (i.e., auto-increment or auto-decrement) addressing mode.

"R2" is a general-purpose register used as an address pointer to a destination buffer where the data to be moved is finally stored. As in the use of R1, the nomenclature used with R2 indicates a self-increasing/decreasing address mode.

"R12" is a particular general-purpose register that is used in the code sequence as a loop counter. In this case, the loop counter counts in words, as opposed to bytes, nibbles, double-words, or some other value. With respect to the width of the address bus in any particular embodiment, the loop counter may stride (i.e., increment/decrement) with a step value of 1, 2, 4, or some other number. The use of "0" in code sequence of Table 2, in the present nomenclature, implies that the low part of R12 is used for the loop counter. For example, in some cases, where R12 is a 16-bit register, the loop counter will be implemented in the lower eight bits. In other examples, such as where R12 is a 32-bit register, the loop counter will be implemented in the lower 16 bits. The inventive concepts described in the present disclosure are not limited by width of any particular register, and the inclusion of such discussion herein helps to illuminate the flexibility of the concepts described herein.

"LDW" is a load instruction. As the load instruction is used in the sequence of Table 2, a word is retrieved from a location pointed to by the address stored in R1, and the retrieved word is stored in general-purpose register R0. In addition, after the word is retrieved, the value stored in general-purpose register R1, which is the source address of data being moved, is incremented by one. In this way, R1 will be now point to a "next" word that will be retrieved.

"STW" is a store instruction. As used in the code sequence sample of Table 2, the value stored in the general-purpose register R0 (i.e., the word just retrieved by the LDW instruction), is stored in memory at an address pointed to by the value stored in R2. After storing the word, the value in R2 is incremented by one. In this way, R2 will now point to the address where a "next" word will be stored.

"JNZS" is a jump-if-not-zero instruction. Here, R12 is indicated as the loop counter, and "0" indicates the low portion of the loop counter, as previously described. The instruction interrogates the value of R12, and if R12 is not zero, then R12 is decremented, and program flow returns to the location of the label "LOOP." Alternatively, if R12 is zero, then program flow falls through to the next following instruction, which is not shown in the code sequence of Table 2.

In the example of Table 2, the total number of cycles executed to implement the iterative load and store operation is the buffer length times two. Stated differently, a certain number of words (i.e., the buffer length) will be moved from one buffer to a second buffer. To carry out the move, two instructions are executed (i.e., LDW and STW), and each instruction takes one cycle to execute. Accordingly, two instruction cycles are used to move each word of data in the buffer, and the total number of cycles to move all of the data is equal to the number of words in the buffer times two. The overhead to calculate and control the jump-back operation is merged together with a previous instruction, which improves the performance efficiency.

Describing in more detail the code sequence of Table 2, the control instruction JNZS does not require any extra processor execution cycles. Instead, the embodiments described in the present disclosure recognize the special code described herein, and the JNZS instruction is executed concurrently with another instruction, which in the example of Table 2 is the STW instruction.

One embodiment of the special loop instruction "JNZS" is now described in more detail. In the embodiment, the embedded DSP operates as a 16-bit machine, although a differently sized architecture could certainly be used. Also in the embodiment, two particular registers are arranged to be used as loop counters R12 and R13. More or fewer registers, and different registers or different memory areas, could be used as loop counters. Still further in the present embodiment, however, since each loop counter may select a low portion (i.e., by including "0" in the JNZS instruction) or a high portion (i.e., by including "1" in the JNZS instruction), four loop counters are available, which are the low portion and high portion of R12 and the low portion and high portion of R13. Therefore, in the embodiment now described, the embedded DSP may support up to four levels of loop nest. In other embodiments, changing the number of counters to more or fewer than four will change the number of co-existing loops and the depth level to which loops can be nested.

In the embodiment now described, the special loop instruction JNZS performs the zero-overhead loop to increase the performance of an embedded DSP. The JNZS instruction executes a PC-relative jump operation according to the comparison result of the implicated loop counter (i.e., the high or low portion of R12, R13) against zero. Zero is chosen in the present embodiment, but some other value, including a user or programmatically selected value, could also be used. In the present embodiment, when the JNZS operation is performed, if the loop counter is greater than zero, then JNZS subtracts one from the loop counter and jumps backward. To implement the backwards jump in the present embodiment, a 10-bit negative offset value in twos-complement is added to the address of the JNZS instruction to form a PC-relative target address. The 10-bit negative offset value in twos-complement is formed by appending 1'b1 before the 8-bit offset and by appending 1'b0 after it. The 8-bit offset is identified in the instruction by the location of the LOOP label. In the embodiment, since the offset value is negative, the JNZS operation will perform the backward jump when the loop counter is not zero.

After the special loop instruction is recognized by the decoder, the decoder embodiments described herein will form a new instruction to combine the condition jump of the special loop instruction with a "normal" instruction.

In some embodiments, the instruction selected for combination with the special loop instruction is the instruction inside the loop that falls just prior to the special loop instruction. In some embodiments the instruction selected for combination with the special loop instruction is the first instruction of the loop sequence where program flow will return to when the condition to exit the loop is not met. In still other embodiments, the instruction selected for combination with the special loop instruction is the first instruction that falls just after the special loop instruction (i.e., the first instruction just outside of the loop sequence, which is where program flow will fall to when the condition to exit the loop is met).

Instructions in a single-issue embedded DSP will often contain a variable number of tokens. Tokens are basic units to construct variable length instructions. In order to correctly decode variable length instructions, the decoding logic of the embedded DSP implements one or more token buffers, which are used as temporary working space in the processing and execution of instructions.

The embedded DSP embodiments also include decode logic to select a variable number of tokens according to the opcode inside any given instruction. For example, in the case of 16-bit tokens, wherein instructions are formed with 1, 2, or 3 tokens, and a data bus that is 64-bits wide, a tokens buffer maybe arranged to store at least 128 bits for two 64-bit data words, 256 bits for four 64-bit data words, or some other width and depth.

FIG. 2 is a block diagram showing a decode logic embodiment 100 to selectively decode a special loop instruction with a normal instruction. The decode logic embodiment 100 of FIG. 2 is integrated in an embodiment of an embedded DSP. Embedded DSP embodiment of FIG.

2 is arranged according to a 64-bit architecture, but many other architectural widths have been contemplated. In addition, the embedded DSP embodiment of FIG. 2 has been arranged having two token buffers 104, 106, and each token buffer is illustrated having a depth of four tokens. The number of token buffers, depth of token buffers, configuration of multiplexers that withdraw tokens, and other features of the embodiment of FIG. 2 have been selected as non-limiting features for purposes of describing the concepts of the present disclosure. Such parameters having different values may also be selected and integrated into a single-issue embedded DSP without departing from the inventive concepts described herein.

In every execution cycle of an embedded DSP embodiment configured with the decode logic of FIG. 2, the fetch logic 102 will retrieve one or more instructions from memory 120. In addition, the fetch logic 102 will upload 64 bits of instruction data from the memory 120 to the first token buffer 104 and the second token buffer 106. In the embedded DSP embodiment, the instructions may contain a variable number of tokens, and accordingly each 64-bit instruction fetch performed by the fetch logic 102 may retrieve a complete instruction, a plurality of complete instructions, a portion of a complete instruction, portions of a plurality of complete instructions, or one or more complete instructions along with some portion of an instruction. During the instruction cycle, the decode logic will select a variable number of tokens from one or both the first token buffer 104 and the second token buffer 106 as one single instruction.

A first eight-to-one multiplexer 108 will withdraw tokens from the first token buffer 104 or the second token buffer 106 as directed by the selection line from the token pointer 112 as each instruction is executed. The tokens withdrawn from the first token buffer 104 and the second token buffer 106 according to the first multiplexer 108 are decoded and executed according to the operations of the embedded DSP.

Concurrent with the withdrawal of tokens from the first token buffer 104 and the second token buffer 106 by the first multiplexer 108, a second multiplexer 110 is also arranged to retrieve tokens from the first token buffer 104 and the second token buffer 106. In this way, it is shown that as instructions are being formed for execution in the length decode logic 114, prospective special loop instructions may be analyzed by the loop decode logic 116. Stated in another way, during the time that instructions are being formed for subsequent execution by the length decode logic 114, the loop decode logic 116 may look ahead to detect whether or not a special loop instruction will soon be executed. When a token of the special loop instruction is detected, the number of tokens in the current instruction is determined, and then the first token of the next instruction (i.e., the special loop instruction) is also selected. In this way, tokens for a current instruction along with a token for the special loop instruction are decoded together and formed as a single instruction.

Formation of the single instruction is performed in cooperation with the loop decode logic 116 and the loop control (i.e., counter check) logic 118. Using information associated with the special loop control token, the control logic 118 tests the condition of the loop counter and directs a modification to the loop counter. For example, the modification may be an increment or decrement of the loop counter by some selected step value, such as one, and modification of the loop counter may be performed based on the results of the conditional test, or the loop counter may be updated unconditionally.

The results of the conditional test of the loop counter are passed to the length decode logic 114 for additional processing. The additional processing directs the formation of the finally assembled single instruction to either include a jump operation to return back to a previous instruction and perform another iteration of the loop, or to exclude such a jump operation so that program exits the loop.

After the formation of the single instruction by the length decode logic 114, the single instruction is executed by an execution unit 122. In each instruction cycle, the execution unit 122 executes a single instruction. In some cases, such as when the special loop instruction branch is included, the single instruction includes two or more operations. For example, in embodiments described herein, a last instruction within an iterative loop is performed in the same instruction cycle as one or more control instructions (e.g., a loop counter test instruction, a loop counter modification instruction, and a branch instruction of the iterative loop) are performed. In some cases, the single execution cycle is performed during a single clock cycle of the embedded DSP. In other cases, the single execution cycle is performed within a plurality of clock cycles of the embedded DSP.

In comparison to a DSP or another type of processor that issues multiple instructions (i.e., a multi-issue machine), the decode logic described with reference to FIG. 2 is very different. The decode logic described herein does not execute any extra control instructions to manage a loop. Instead, only a single instruction is executed for each essential operation inside the loop, and there is zero overhead. This operation does not exist in a conventional single-issue instruction processor, and this operation is not mimicked by a multi-issue processor, a conventional pipelined processor, or any other type of processor.

The innovative features described herein may be implemented with a pipelined or non-pipelined single-issue embedded DSP. The decode logic of the new device, such as in the embodiment of FIG. 2, does not execute the control instructions of a traditional processor. Instead, the decode logic decodes the special loop instruction concurrently with a normal instruction, and the decode logic continuously checks during each instruction cycle to determine if a next instruction is a special loop instruction.

As evident in FIG. 2, only a small amount of additional structure is formed in the innovative embedded DSP. The additional structure may include an additional multiplexer 110, loop decode logic 116, and loop control logic 118. In addition, some modifications may also be made to length decode logic 114 and to the token pointer logic 112. In some cases, a register dependency operation on a counter may be implemented, and an additional register port to store an internal counter value may be implemented. For example, a loop counter may be formed and updated or otherwise maintained in the loop control module 118. No additional structure or logic is required, which saves area on an integrated circuit chip die, and which also reduces energy consumption over other solutions which attempt to make looping logic more efficient.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Certain words and phrases used in the present disclosure are set forth as follows. The terms "include" and "comprise," as well as derivatives thereof, mean inclusion without limitation. Unless the context requires otherwise, throughout the specification and claims which follow, the word "comprise" and variations thereof, such as, "comprises" and "comprising" are to be construed in an open, inclusive sense, e.g., "including, but not limited to." The phrases "associated with" and "associated therewith," as well as derivatives thereof in all grammatical forms, may mean to include, be included within, interconnect with, contain, be contained within, connect to or with, couple to or with, be communicable with, cooperate with, interleave, juxtapose, be proximate to, be bound to or with, have, have a property of, or the like.

Processors described herein include central processing units (CPU's), microcontrollers (MCU), digital signal processors (DSP), application specific integrated circuits (ASIC), and the like. Except where expressly limited in the context of the present specification, the processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts.

As known by one skilled in the art, a computing device has one or more memories such as memory 120, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

As used in the present disclosure, the term "module" refers to an application specific integrated circuit (ASIC), an electronic circuit, a processor and a memory operative to execute one or more software or firmware programs, combinational logic circuitry, or other suitable components (i.e., hardware, software, or hardware and software) that provide the functionality described with respect to the module.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A decoding logic module arranged to execute a zero-overhead loop, comprising:
   a fetch logic module;
   a token buffer coupled to the fetch logic module and arranged to store instruction tokens passed from the fetch logic module;
   a first decode module;
   a second decode module;
   a first multiplexer coupled between the token buffer and the first decode module and arranged to pass instruction tokens from the token buffer to the first decode module;
   a second multiplexer coupled between the token buffer and the second decode module and arranged to pass instruction tokens from the token buffer to the second decode module; and
   a loop control module arranged to test a loop counter and further arranged to update the loop counter in cooperation with the second decode module detecting a special loop instruction token, wherein the first decode module is arranged to assemble at least one instruction token of an iterative algorithm into a single instruction executable in a single execution cycle, and based on the loop control module test of the loop counter, the first decode module further arranged to assemble a loop branch instruction of the iterative algorithm into the single instruction executable in the single execution cycle.

2. A decoding logic module according to claim 1, wherein the iterative algorithm is executed in a kernel mode of an embedded digital signal processor.

3. A decoding logic module according to claim 1, wherein the loop control module arranged to test of the loop counter includes the loop control module arranged to compare the loop counter to zero, and wherein the loop control module arranged to further update the loop counter includes the loop control module arranged to decrement the loop counter.

4. A decoding logic module according to claim 1, comprising:
a token pointer arranged to direct the passage of instruction tokens through the first multiplexer to the first decode module, the token pointer further arranged to direct passage of the special loop instruction token through the first multiplexer to the first decode module based on the loop control module test of the loop counter.

5. A decoding logic module according to claim 1, wherein the single execution cycle is performed in a single clock cycle.

6. A decoding logic module according to claim 1, wherein the decoding logic module is arranged in an embedded digital signal processor.

7. A decoding logic module according to claim 1, wherein the first decode module is arranged to select which instruction tokens are passed from the token buffer to the second decode module through the second multiplexer.

8. A decoding logic method to execute a zero-overhead loop, comprising:
fetching instruction data from a memory;
storing a plurality of instruction tokens in a token buffer, the plurality of instruction tokens derived from the instruction data;
passing at least a first portion of one or more instruction tokens from the token buffer to a first decode module, the first decode module being an instruction decode module;
passing at least a second portion of one or more instruction tokens from the token buffer to a second decode module, the second decode module being a loop decode module;
detecting, with the second decode module, a special loop instruction token;
based on the detection of the special loop instruction token, conditionally testing a loop counter;
assembling, with the first decode module, at least one instruction token of an iterative algorithm into a single instruction executable in a single execution cycle; and
based on the conditional test of the loop counter, further assembling, with the first decode module, a loop branch instruction of the iterative algorithm into the single instruction executable in one execution cycle.

9. A decoding logic method according to claim 8, wherein the special loop instruction is arranged for performance in the iterative algorithm just after a last instruction of the iterative algorithm.

10. A decoding logic method according to claim 8, comprising:
updating the loop counter in association with conditionally testing the loop counter.

11. A decoding logic method according to claim 10, wherein updating the loop counter includes decrementing the loop counter.

12. A decoding logic method according to claim 8, comprising:
unconditionally updating the loop counter each time a special loop instruction token is detected.

13. A decoding logic method according to claim 8, wherein conditionally testing the loop counter includes comparing the loop counter to zero.

14. A decoding logic method according to claim 8, wherein the iterative algorithm is associated with a fast Fourier transform (FFT) algorithm or a finite impulse response (FIR) filter algorithm.

15. A decoding logic method according to claim 8, comprising:
executing the single instruction during a next single execution cycle.

16. An integrated circuit, comprising:
a decoding logic module arranged to execute a zero-overhead loop, the decoding logic including:
a fetch logic module to receive instruction data from a memory;
a token buffer arranged to store a plurality of instruction tokens retrieved from the instruction data;
a first decode logic module to assemble one or more tokens into a single instruction, the single instruction executable in a single execution cycle;
a second decode logic module to identify a special loop instruction token;
a first multiplexer to copy at least some of the one or more tokens from the token buffer to the first decode logic module;
a second multiplexer to copy a prospective special loop instruction token to the second decode module, wherein upon detection of the special loop instruction token, a loop control module is arranged to test and modify a loop counter, and wherein upon detection of the loop counter crossing a threshold, the first decode logic module to assemble a loop branch instruction into the single instruction.

17. An integrated circuit according to claim 16, wherein the integrated circuit is arranged as an embedded digital signal processor (DSP).

18. An integrated circuit according to claim 16, comprising:
an execution unit to execute the single instruction in one execution cycle, the single instruction arranged to carry out at least two operations, a first one of the at least two operations being a last operation of an iterative loop, and a second one of the at least two operations being a jump operation of the iterative loop.

19. An integrated circuit according to claim 16, wherein the first decode logic is arranged to assemble the one or more tokens into the single instruction concurrent with a time that the loop control module is arranged to test and modify the loop counter.

20. An integrated circuit according to claim 16, wherein the threshold is zero.

* * * * *